United States Patent
Matsumoto (10) Patent No.: US 6,928,631 B2
(45) Date of Patent: Aug. 9, 2005

(54) CIRCUIT DESIGN METHOD AND COMPUTER PROGRAM PRODUCT

(75) Inventor: Sho Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 77 days.

(21) Appl. No.: 10/366,411

(22) Filed: Feb. 14, 2003

(65) Prior Publication Data

US 2003/0177462 A1 Sep. 18, 2003

(30) Foreign Application Priority Data

Mar. 15, 2002 (JP) ........................................ 2002-072736

(51) Int. Cl.$^7$ ............................................. G06F 17/50
(52) U.S. Cl. ................... 716/6; 716/2; 716/14
(58) Field of Search ............... 716/2, 6, 14, 7, 716/10, 17

(56) References Cited

U.S. PATENT DOCUMENTS 6,272,668 B1 * 8/2001 Teene ......................... 716/10
6,425,115 B1 * 7/2002 Risler et al. .................. 716/17

OTHER PUBLICATIONS

Patent Abstracts of Japan of JP 4–288717 A dated Oct. 13, 1992.

Patent Abstracts of Japan of JP 4–333261 A dated Nov. 20, 1992.

* cited by examiner

*Primary Examiner*—Thuan Do
(74) *Attorney, Agent, or Firm*—Staas & Halsey LLP (57) ABSTRACT

A circuit design technology which can facilitate timing adjustment for a circuit whose layout has been designed. The circuit design method including the steps of entering design data for a circuit including a variable delay cell inserted in advance at a part where delay adjustment is expected necessary in terms of a circuit characteristic during an initial layout, analyzing timing of the entered design data, and correcting the delay in the variable delay cell when an error occurs as a result of the timing analysis.

10 Claims, 6 Drawing Sheets

|  | PROCESSING FOR REFERENCE | PROCESSING FOR EMBODIMENT |
|---|---|---|
| LAYOUT PREPROCESSING | 2.0H | 2.0H |
| MANUAL PLACEMENT | 2.0H | --- |
| LAYOUT INTERMEDIATE PROCESSING | 0.5H | 0.5H |
| ROUTING | 8.0H | --- |
| RC INFORMATION EXTRACTION | 4.0H | 4.0H |
| DELAY CALCULATION | 0.5H | 0.5H |
| TIMING ANALYSIS | 4.0H | 4.0H |
| TOTAL | 21.0H | 11.0H |

CIRCUIT DESIGN METHOD AND COMPUTER PROGRAM PRODUCT

CROSS-REFERENCE TO RELATED APPLICATIONS

This application is based upon and claims the benefit of priority from the prior Japanese Patent Application No. 2002-072736, filed on Mar. 15, 2002, the entire contents of which are incorporated herein by reference.

BACKGROUND OF THE INVENTION

1. Field of the Invention

The present invention relates to a circuit design technology, and specifically relates to a circuit design technology for facilitating timing adjustment for a circuit whose layout has been designed.

2. Description of the Related Art

As a scale increase, a speed increase, and miniaturization of a semiconductor chip advance, LSI (Large Scale Integration) design is getting complicated. In addition, recently, importance of adapting to DFT (Design For Test), adapting to increasing complexity of clock circuit due to insertion of a gated clock cell for decreasing power consumption, and fine-tuning timing in an interface (I/F) with an external DRAM circuit is increasing. As a result, a method for adjusting timing highly precisely in a short TAT (Turn Around Time) is being sought.

Since adjusting (correcting) the timing during LSI development requires a large amount of processing time since a layout process is conducted again after the timing is adjusted. Also, since the layout process is repeated, cell placement and routing change slightly, and consequently, a problem such as a new timing error occurs.

SUMMARY OF THE INVENTION

An object of the present invention is to provide a circuit design technology for efficiently adjusting circuit timing in a short TAT.

A first aspect of the present invention is to provide a circuit design method including the steps of entering design data for a circuit including a variable delay cell inserted in advance during an initial layout at a part where delay adjustment is expected necessary in terms of a circuit characteristic, analyzing timing of the entered design data, and correcting the delay in the variable delay cell when an error occurs as a result of the timing analysis.

With this constitution, since the variable delay cell is inserted into a circuit in advance, and the delay in the variable delay cell can be corrected when a timing error is generated, it is not necessary to change cells other than the variable delay cell, and external routing. Consequently, the timing for a circuit is adjusted efficiently in a short period, and thus the design time can be reduced.

DETAILED DESCRIPTION OF THE PREFERRED EMBODIMENTS

Figure 1:
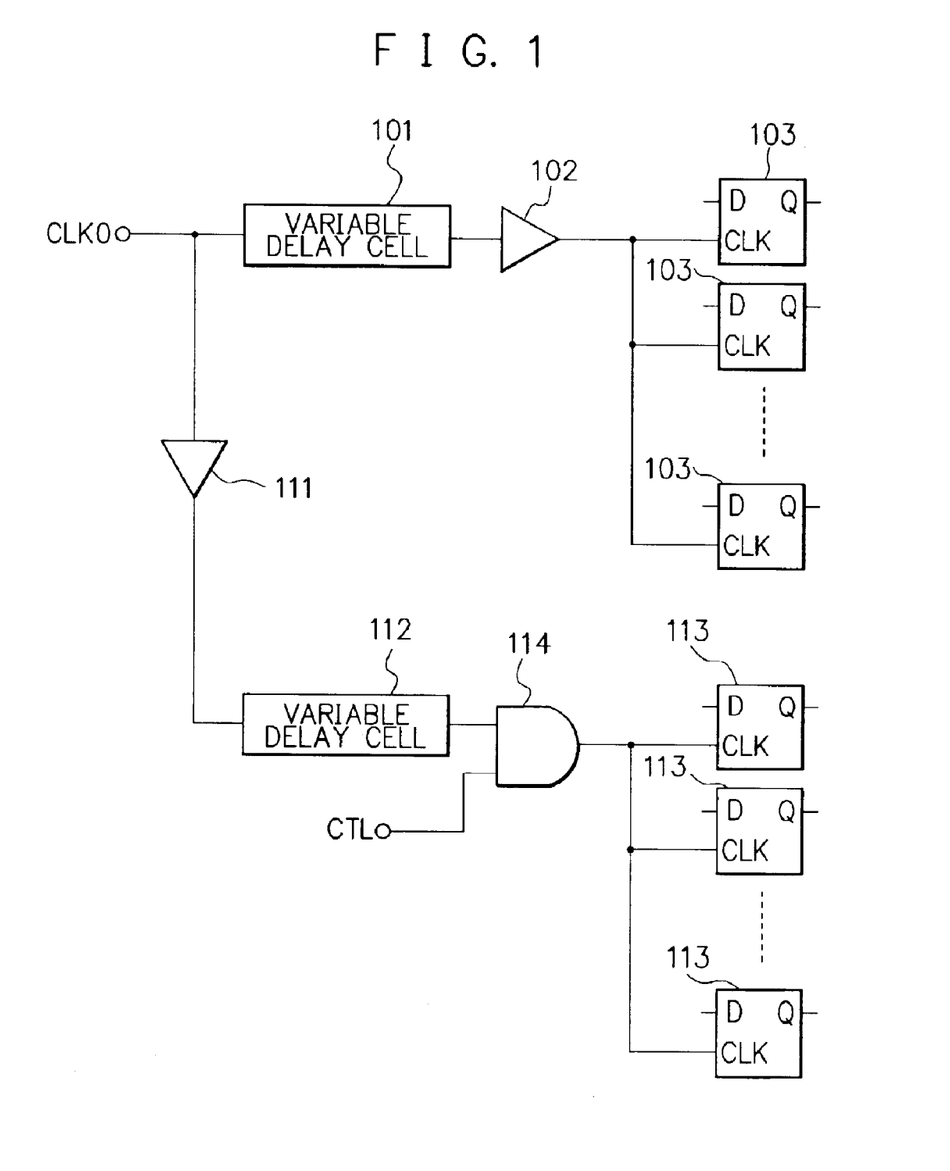
FIG. 1 is a circuit diagram of an integrated circuit describing an integrated circuit design method according to an embodiment of the present invention.

FIG. 1 is a circuit diagram of an integrated circuit describing an integrated circuit design method according to an embodiment of the present invention. This integrated circuit is formed as a semiconductor chip. The integrated circuit includes a large number of D type flip-flops (simply referred to as a flip-flop hereafter) 103 and 113. The flip-flops 103 and 113 are logic circuits, and supply a datum from an output terminal Q based on an input datum entered on an input terminal D in sync with a clock signal on a clock terminal CLK.

A clock signal is supplied for a clock input terminal CLK0. Then, the clock signal is supplied for the clock terminal CLK of a large number of the flip-flops 103 through a variable delay cell 101 and a buffer 102. The clock signal on the clock input terminal CLK0 is also supplied for the clock terminal CLK of a large number of the flip-flops 113 through a buffer 111, a variable delay cell 112, and a logical addition (AND) circuit 114.

The buffers 102 and 111 amplify currents of the clock signals supplied for a large number of the flip-flops 103 and 113. The AND circuit 114 is a gated clock cell. The output of the clock signal is switched between on and off by controlling the level of a control terminal CTL of the AND circuit 114. Specifically, the output of the clock signal is enabled when the control terminal CTL is set to the high level, and the output of the clock signal is disabled when the control terminal CTL is set to the low level. Setting the output of the clock signal disabled reduces the power consumption of a large number of the flip-flops 113.

It is necessary to supply the entire flip-flops 103 and 113 with the clock signal at the same timing. However, a delay is generated between an input signal and an output signal in the buffers 102 and 111, and the AND circuit 114. In addition, a delay is generated according to the length of a connection route. As a result, skews occur between the clock signals supplied for the individual flip-flops 103 and 113. If these skews are large, a timing error occurs, and consequently the integrated circuit does not operate properly. The variable delay cells 101 and 112 serve so as to adjust the delays of the clock signals for eliminating the timing error.

There is such a method as inserting a new delay cell without using the variable delay cell when a timing error occurs. This method has the following defects. First, it is necessary to newly determine a place at which the delay cell is inserted. Secondly, there may not be a physical space for inserting a delay cell. Lastly, existing logic cells and routing may be changed for inserting the delay cell. These defects cause a prolonged design time.

In view of the foregoing, during an initial layout process in the present embodiment, circuit design data including the variable delay cells 101 and 112 are inserted in advance at parts where adjusting the delay is expected necessary due to a circuit characteristic are created. Then, timing analysis is conducted for the design data. When an error occurs as a result of the timing analysis, internal routing of the variable delay cells 101 and 112 is adjusted so as to correct the delays of the variable delay cells 101 and 112. This correction resolves the timing error.

Though FIG. 1 shows only two variable delay cells 101 and 112, since as many as tens of thousands of flip-flops actually exist, a large number of the variable delay cells are necessary. In addition, since the frequency of the clock signal is as high as 100 MHz, for example, a slight skew in timing tends to cause a timing error.

Figure 2A:
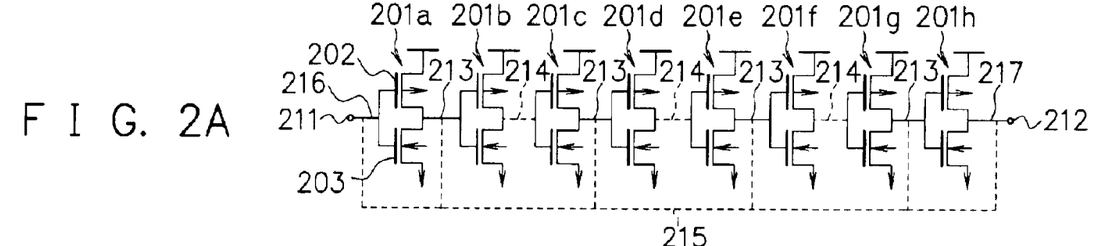
FIGS. 2A through 2C are circuit diagrams showing a basic constitution of a variable delay cell.

FIG. 2A shows a basic constitution of the variable delay cells 101 and 112. The entire variable delay cells 101 and 112 in the integrated circuit have the identical multiple transistor structures. The variable delay cell has eight inverters 201a to 201h, for example. One inverter 201a has a CMOS (Complimentary Metal Oxide Semiconductor) structure which includes a p-channel MOS (Metal Oxide Semiconductor) transistor 202 and an n-channel MOS transistor 203. The gates of the transistors 202 and 203 are connected with each other, and the drains are also connected with each other. The source of the transistor 202 is connected with a power supply line. The source of the transistor 203 is connected with a reference electric potential line (a ground line). The other inverters 201b to 201h have the same constitution as that of the inverter 201a. An input is the interconnection point of the gates, and an output is the interconnection point of the drains in the inverters 201a to 201h.

The variable delay cell has an input terminal 211 and an output terminal 212. The input terminal 211 is connected with the input of the inverter 201a through a route 216. The output terminal 212 is connected with the output of the inverter 201h through a route 217. The individual inverters 201a to 201h logically invert the logic of the input datum and supply it as the output. Thus, a buffer is constituted by serially connecting an even number of the inverters. For example, connecting two inverters forms one buffer, and connecting eight inverters forms four buffers. Solid line 213 indicate existing routes, and broken lines 214 and 215 indicate non-existing routes which can be set as actual routes in FIG. 2A.

Figure 2B:
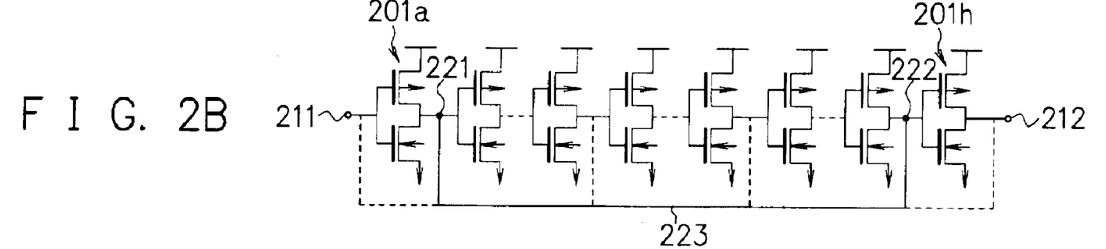

FIG. 2B shows a cell where a route 223 is connected with the cell in FIG. 2A, and thus, this cell realizes a delay cell corresponding to the one buffer. The route 223 connects the output of the inverter 201a and the input of the inverter 201h with each other through interconnection points 221 and 222. The clock signal supplied for the input terminal 211 is provided from the output terminal 212 through the two inverters 201a and 201h. Since the two inverters 201a and 201h correspond to the one buffer, the clock signal is delayed by a period corresponding to the one buffer.

Figure 2C:
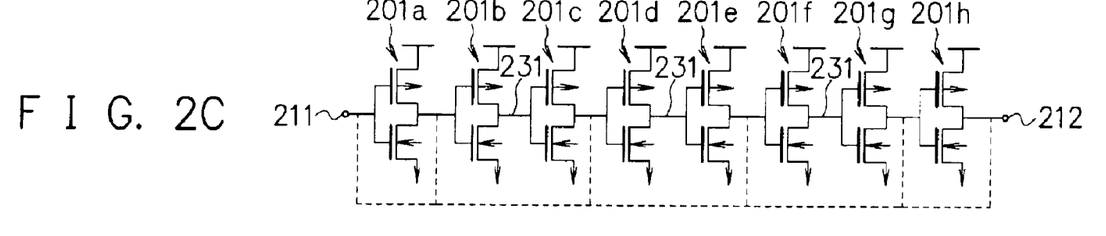

FIG. 2C shows a cell where routes 231 are connected with the cell in FIG. 2A, and thus, this cell realizes a delay cell corresponding to the four buffers. As a result of connecting the routes 231, the clock signal supplied for the input terminal 211 is provided from the output terminal 212 through the eight inverters 201a to 201h. Since the eight inverters 201a to 201h correspond to the four buffers, the clock signal is delayed by a period corresponding to the four buffers.

A delay cell corresponding to zero buffer is constituted by connecting the input terminal 211 and the output terminal 212 with each other in FIG. 2A. In this case, the delay is approximately zero. In the cases described above, though the variable delay cell includes the eight inverters 201a to 201h, the number of the inverters is not limited to eight.

As described above, the plurality of variable delay cells in the integrated circuit include the same multiple transistor structures, and the delay of the variable delay cells is corrected by adjusting the internal routing in the individual variable delay cells. At this time, the delay of the variable delay cell is corrected by adjusting the internal routing of the variable delay cell while the frames and the pin assignments of cells in the integrated circuit are not changed, and simultaneously the internal routing area of the variable delay cell is set as an external routing inhibition area. For example, only the internal routing in the variable delay cell is adjusted while a logic cell such as a flip-flop and the external routing of the variable delay cell are not corrected. For the transistors described above, the unused transistors in addition to the used transistors are connected with the power supply line and the reference electric potential line for stabilizing electric potential. Namely, the entire transistors in the variable delay cell are connected with the power supply.

Figure 3A:
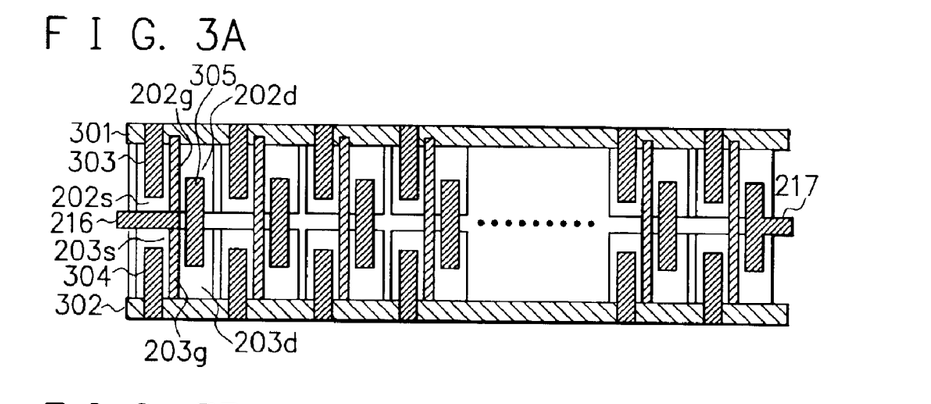
FIGS. 3A through 3C are surface drawings showing semiconductor circuits constituting the variable delay cell.

FIG. 3A is a drawing of a surface of the semiconductor circuit constituting the variable delay cell in FIG. 2A. The transistor 202 includes the gate 202g, the source 202s, and the drain 202d. The gate 202g is connected with the input terminal 211 through the route 216. The source 202s is connected with the power supply line 301 through a route 303. The transistor 203 includes the gate 203g, the source 203s, and the drain 203d. The gate 203g is connected with the input terminal 211 through the route 216. The source 203s is connected with the reference electric potential line 302 through a route 304. The drains 202d and 203d are connected with each other through a route 305. The gates 202g and 203g are connected with each other.

Figure 3B:
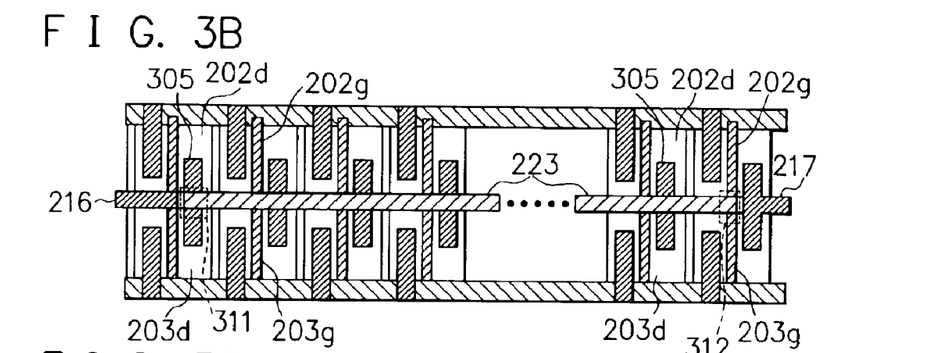
Figure 3C:
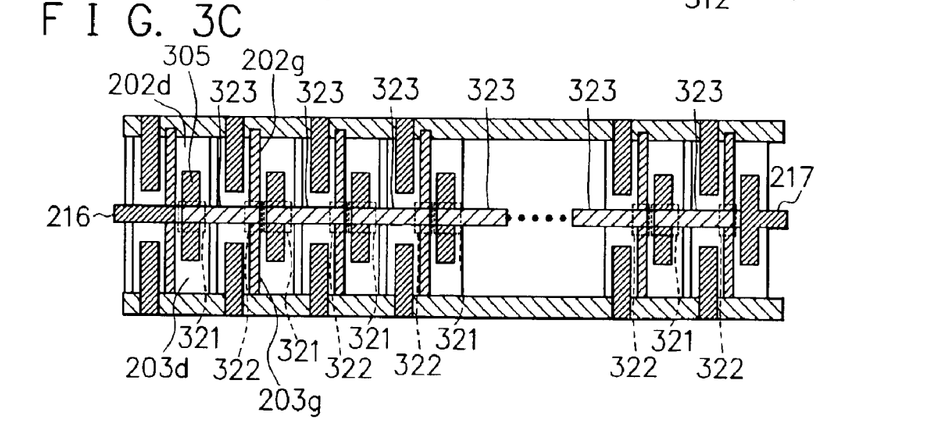

Though the routes 213 are connected in the circuits in FIGS. 2A to 2C, the routes 213 do not exist in the examples in FIGS. 3A to 3C. The existence of the route 213 does not make a difference.

FIG. 3B is a drawing of a surface of the semiconductor circuit constituting the variable delay cell in FIG. 2B. A route 223 and the route 305 are connected with each other in a contact area 311. The route 223 and the gates 202g and 203g are connected with each other in a contact area 312. Namely, the output of the inverter 201a and the input of the inverter 201h are connected with each other. The route 305 is formed on a first routing layer, and the route 223 is formed on a second routing layer upper than the first routing layer.

FIG. 3C is a drawing of a surface of the semiconductor circuit constituting the variable delay cell in FIG. 2C. A route 323 and the route 305 are connected in a contact area 321 of the individual transistors. The route 323 and the gates 202g and 203g are connected with each other in a contact area 322 of the individual transistors. Namely, the output of the individual inverters is connected with the input of the inverter on the next stage. The routes 305 are formed on a first routing layer, and the route 323 is formed on a second routing layer upper than the first routing layer.

Figure 4:
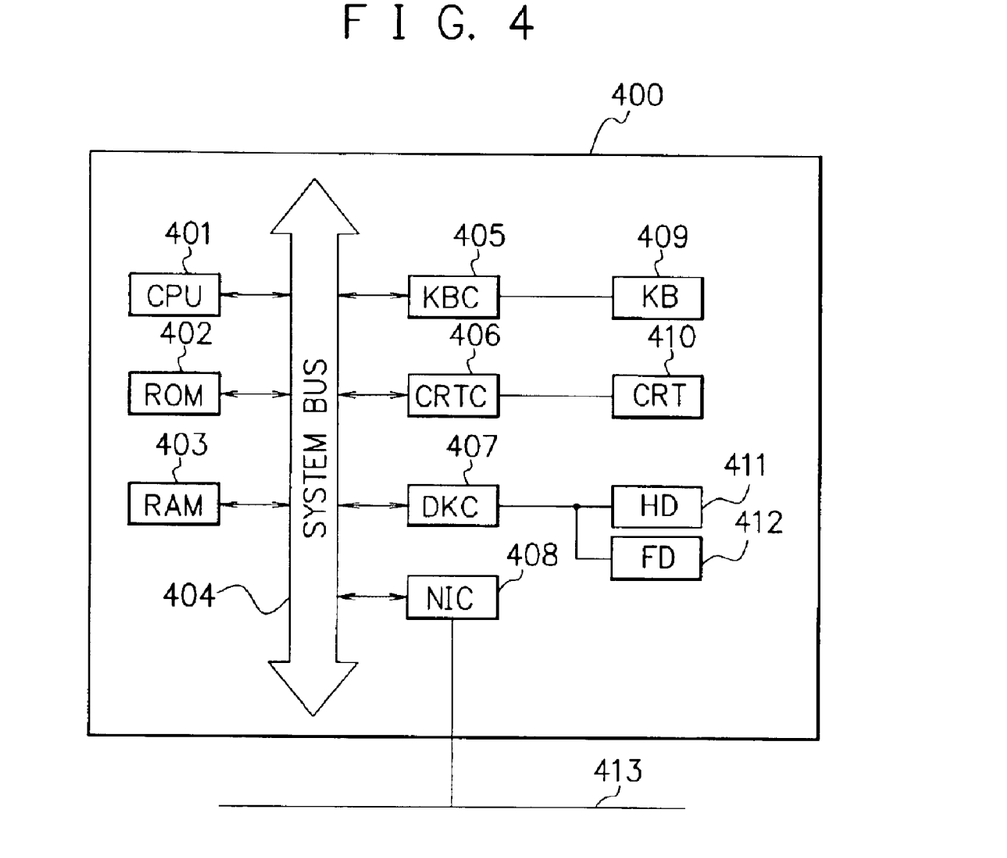
FIG. 4 is a block diagram showing a hardware constitution of a computer for conducting the design according to the present embodiment.

FIG. 4 shows a hardware constitution of a computer (a design apparatus) 400 for designing the integrated circuit described above. The design is conducted by the CAD (Computer Aided Design) system. A CPU 401, a ROM 402, a RAM 403, a keyboard controller (KBC) 405, a CRT controller (CRTC) 406, a disk controller (DKC) 407, and a network interface card (NIC) 408 are connected with a system bus 404.

A keyboard (KB) 409 is an input apparatus, and is connected with the keyboard controller 405. A CRT display (CRT) 410 is a display apparatus, and is connected with the CRT controller 406. A hard disk drive (HD) 411 and a flexible disk drive (FD) 412 are recording media for a program and design data, and are connected with the disk controller 407.

The CPU 401 executes a program stored in the RAM 403 so as to control devices on the system bus 404, and to simultaneously conduct processing for the design. The program on the RAM 403 is supplied from the hard disk drive 411, for example.

The RAM 403 functions as a main memory, a work area, and the like for the CPU 401. The keyboard controller 405 controls an instruction input from the keyboard 409, a pointing device, and the like. The CRT controller 406 controls display of the CRT 410. The disk controller 407 controls access to the hard disk drive 411 and the flexible disk drive 412 which store various applications, user files, network control programs, programs and data for the design, and the like. The network interface card 408 bi-directionally transmits and receives a program and data to and from other devices on a network 413.

Figure 5:
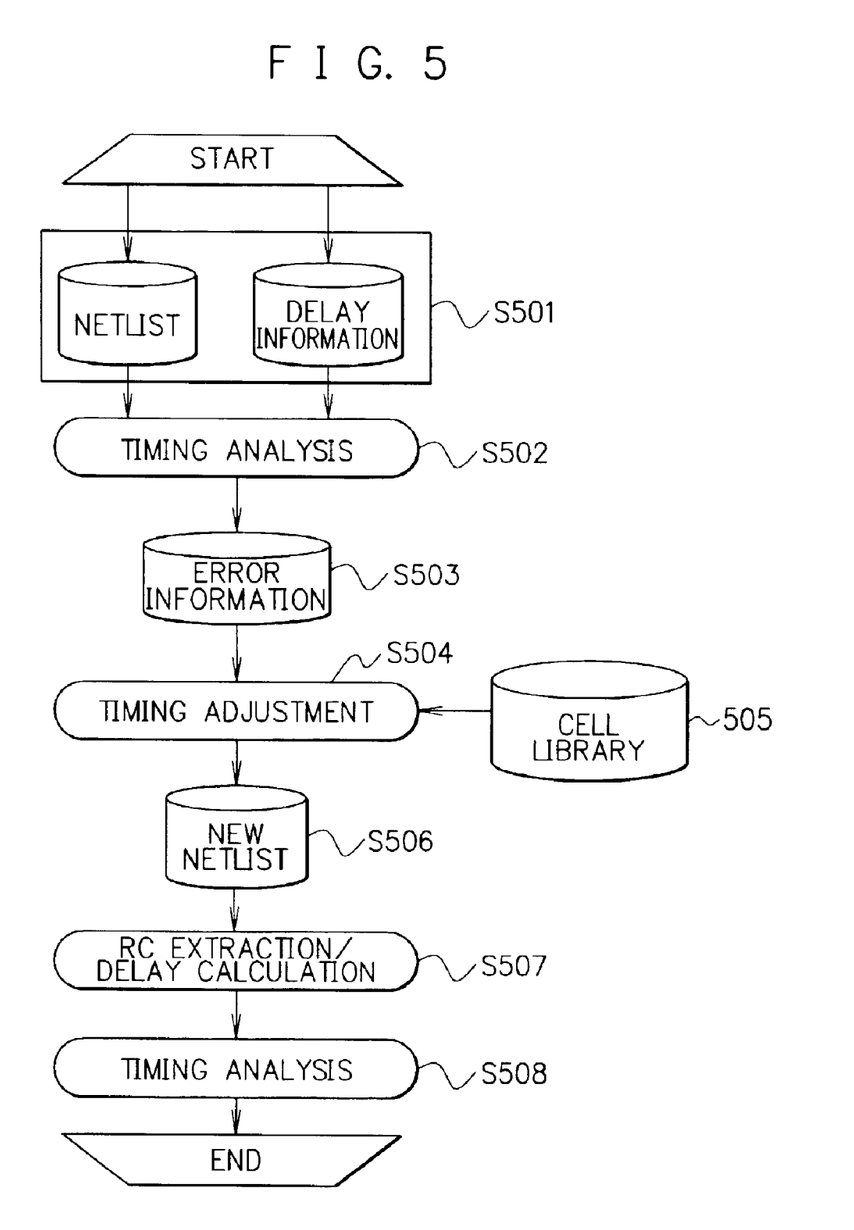
FIG. 5 is a flowchart showing processing by a design program according to the present embodiment.

FIG. 5 is a flowchart showing processing by a design program executed by the CPU 401.

First, design data including a netlist and delay information of an integrated circuit whose layout has been designed are entered in Step S501. The variable delay cells are inserted in the design data in advance at parts of a circuit where delay adjustment is expected necessary, and thus the initial layout has been completed in this design data. The entire variable delay cells in the integrated circuit are cells which include a delay corresponding to the one buffer as shown in FIG. 2B, for example.

The netlist is circuit information representing information relating to cells (such as logic cells and the variable delay cells) constituting the integrated circuit and routing among the cells as a logic image. The delay information indicates information on the delays of the cells themselves, a resistance component, a capacitance component (such as a route capacitance, and a parasitic capacitance), and a delay component (such as an influence from a deformation of a propagating signal) depending on routing length relating to routes among the cells.

Then, a timing analysis is conducted based on the entered netlist and the delay information for the integrated circuit in Step S502. The timing analysis provides signal delays between the flip-flops in the integrated circuit, timing error information, and the like.

The timing error includes a setup error and a hold error. The following section describes the setup error. Since the flip-flop (a sequential circuit) receives an input signal in sync with a clock signal, it is necessary to establish the input signal a predetermined period before the input signal is taken in, and then to keep the signal. If this condition is not met, the setup error is generated. The following section describes the hold error. Once a flip-flop starts receiving an input signal, the change of the signal is inhibited for a certain period. If this condition is not met, the hold error is generated.

Then, error information is extracted, and then recorded based on the result of the timing analysis described above in Step S503.

Then, timing is adjusted so as to correct the error based on the error information in Step S504. In this state, a point with a large clock skew is analyzed while a shift of the clock timing (a clock skew) is considered, and variable delay cells are switched based on a cell library 505. Various logic cells and various variable delay cells having a variable number of buffers connected between the input and output terminals are registered in the cell library 505. Since the variable delay cell has the delay corresponding to the one buffer in the timing analysis described above, this variable delay cell is switched to a variable delay cell having a smaller or a larger number of the buffers according to the error. Namely, the variable delay cells are swapped in the netlist, and thus the delay is adjusted.

Then, an updated netlist reflecting switching the variable delay cells is recorded in Step S506.

Then, the RC information is extracted again for calculating the delay information based on the updated netlist in Step S507. The RC information is information on the resistance component and the capacitance component.

Then, the timing analysis is conducted again for confirming that the timing error is eliminated in Step S508.

As described above, timing is adjusted by switching a variable delay cell to a variable delay cell with a different number of the buffers when a timing error occurs. If the variable delay cell is not used, since processing for newly inserting a delay cell, and then, processing for routing to this cell is added, a longer time is required. This case is referred to as a reference (FIG. 6) hereafter.

In the present embodiment, it is only necessary to change the internal routing in the variable delay cell in the integrated circuit, and thus, it is not necessary to change cells other than the variable delay cells and external routing. Therefore, the design time is reduced largely.

Figure 6:
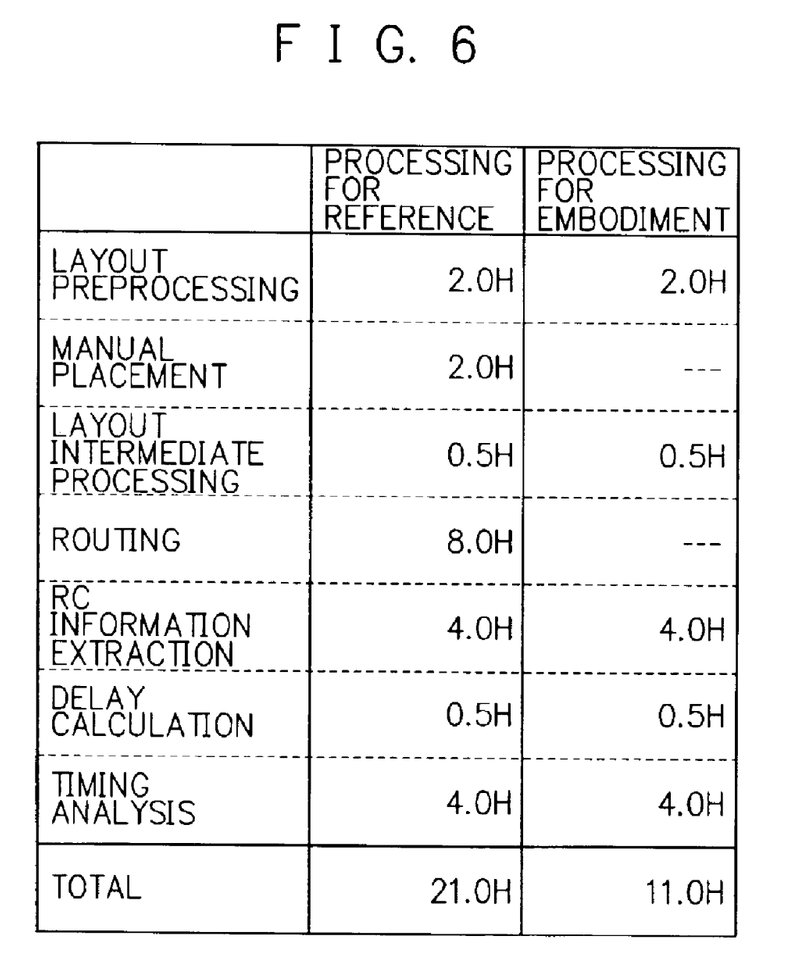
FIG. 6 is a diagram showing design processing time.

In FIG. 6, a left column shows a design processing time in the reference, and a right column shows a design processing time in the present embodiment. TATs of an LSI for a digital still camera are shown as an example. In the reference, layout preprocessing takes 2.0 hours, manual placement takes 2.0 hours, layout intermediate processing takes 0.5 hours, routing takes 8.0 hours, RC information extraction takes 4.0 hours, delay calculation takes 0.5 hours, and timing analysis takes 4.0 hours. Thus, a total of 21.0 hours are necessary.

In the present embodiment, since processing for the manual placement (2.0 hours) and the routing (8.0 hours) is eliminated, a total of 11.0 hours is only necessary. The manual placement is processing for inserting a new delay cell based on a timing error. In the present embodiment, since the variable delay cell is inserted in advance, and the variable delay cells are simply switched based on a timing error, the manual placement is eliminated. The routing is processing for routing for the newly inserted delay cell. In the present embodiment, since the internal routing is simply switched in the variable delay cell, and the frame and the pin assignment of other cells, and the external routing are not changed, the routing is eliminated.

While the reference takes a total of 21.0 hours, the present embodiment takes only 11.0 hours. Namely, the present embodiment reduces the design time by 48%.

As described above, design data for a circuit including a variable delay cell inserted in advance at a part where delay adjustment is expected necessary in terms of a circuit characteristic are entered during an initial layout in the first step. Timing is analyzed for the entered design data in the second step. The delay in the variable delay cell is corrected when an error occurs as a result of said timing analysis in the third step.

When a timing error occurs, since the delay is adjusted by correcting the delay in the variable delay cell, it is not necessary to change cells other than the variable delay cells, and external routing. Consequently, the timing is efficiently adjusted in a short period, and thus, the design time is reduced.

The present embodiment is realized by executing a program on a computer. Means for supplying the computer with this program such as a computer-readable recording medium storing this program, a CD-ROM, for example, and a transmission medium such as the Internet which transmits this program can be used as an embodiment of the present invention. A computer program product such as a computer-readable recording medium which records this program can be used as an embodiment of the present invention. This program, the recording medium, the transmission medium, and the computer program product are included in the scope of the present invention. As the recording medium, a flexible disk, a hard disk, an optical disk, a magneto-optical desk, a CD-ROM, a magnetic tape, a non-volatile memory card, and a ROM are used.

Since the present embodiments simply show specific examples for embodying the present invention, technical scope of the present invention should not be restrictively interpreted due to the embodiments. Namely, the present invention can be embodied in various forms without deviating from its technical idea or its principal aspects.

As described above, since the variable delay cell is inserted into a circuit in advance, and the internal delay in the variable delay cell is corrected when a timing error occurs, it is not necessary to change cells other than the variable delay cell, or the external routing. As a result, the timing of the circuit is adjusted efficiently and quickly, and thus the design time can be reduced.

What is claimed is:

1. A circuit design method, comprising:

entering design data for a circuit including one or plural variable delay cells, inserted in advance during an initial layout at a part where delay adjustment is expected to be necessary in terms of a circuit characteristic, individual said variable delay cells having identical multiple transistor structures and each said variable delay cell comprising a buffer having a plurality of transistors and an even number of inverters having a CMOS structure;

analyzing timing of said entered design data; and correcting a delay in each individual variable delay cell, when an error occurs therein as a result of said timing analysis, by adjusting a number of said inverters connected in said individual variable delay cell.

2. The circuit design method according to claim 1, wherein the internal routing in said variable delay cell is adjusted while a frame and a pin assignment of a cell are not changed in a circuit constituted by the design data, and an internal routing area is set to an external routing inhibition area in said variable delay cell in said correcting.

3. The circuit design method according to claim 2, wherein said design data include data on a logic cell in addition to the data on the variable delay cells, and said delay is corrected by adjusting the internal routing in said variable delay cell without correcting said logic cell in said correcting.

4. The circuit design method according to claim 3, wherein said delay is corrected by adjusting the internal routing in said variable delay cell without correcting external routing of said variable delay cell in said correcting.

5. The circuit design method according to claim 1, wherein all transistors in said variable delay cell are connected with a power supply.

6. A computer program product for designing a circuit, comprising:

a first computer readable program code entering design data for a circuit including one or plural variable delay cells inserted in advance during an initial layout at a part where delay adjustment is expected to be necessary in terms of a circuit characteristic, said design data including data on a plurality of variable delay cells, individual said variable delay cells having identical multiple transistor structures, said variable delay cell comprising a buffer having a plurality of transistors and each said buffer having an even number of inverters having a CMOS structure;

a second computer readable program code analyzing timing of said entered design data; and a third computer readable program code correcting a delay in said variable delay cell when an error occurs as a result of said timing analysis, by adjusting a number of said inverters to be connected in said individual variable delay cell.

7. The computer program product for designing circuit according to claim 6, wherein the internal routing in said variable delay cell is adjusted while a frame and a pin assignment of a cell are not changed in a circuit constituted by the design data, and an internal routing area is set to an external routing inhibition area in said variable delay cell in said third computer readable program code.

8. The computer program product for designing circuit according to claim 7, wherein said design data include data on a logic cell in addition to the data on the variable delay cells, and said delay is corrected by adjusting the internal routing in said variable delay cell without correcting said logic cell in said third computer readable program code.

9. The computer program product for designing circuit according to claim 8, wherein said delay is corrected by adjusting the internal routing in said variable delay cell without correcting external routing of said variable delay cell in said third computer readable program code.

10. The computer program product for designing circuit according to claim 6, wherein all transistors in said variable delay cell are connected with a power supply.

* * * * *